US009868372B2

(12) United States Patent
McCoy et al.

(10) Patent No.: US 9,868,372 B2
(45) Date of Patent: Jan. 16, 2018

(54) ENERGY ABSORBING SEATBACK PANEL (71) Applicant: Ford Global Technologies, LLC, Dearborn, MI (US)

(72) Inventors: Robert William McCoy, Ann Arbor, MI (US); Dean M. Jaradi, Macomb, MI (US); Mohammed Omar Faruque, Ann Harbor, MI (US); Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 14/685,918

(22) Filed: Apr. 14, 2015

(65) Prior Publication Data
US 2016/0304046 A1    Oct. 20, 2016

(51) Int. Cl.
    *B60N 2/42*    (2006.01)
    *B60R 21/02*   (2006.01)
(52) U.S. Cl.
    CPC ............ *B60N 2/4228* (2013.01); *B60R 21/02* (2013.01); *B60R 2021/022* (2013.01); *B60R 2021/0273* (2013.01)
(58) Field of Classification Search
    CPC  B60N 2/427; B60N 2/42709; B60N 2/42727; B60N 2/42745; B60N 2/433; B60N 2/686; B60R 2021/022; B60R 2021/0221; B60R 2021/0273; B60R 2021/0293
    See application file for complete search history.

(56) References Cited

U.S. PATENT DOCUMENTS

| 2,867,266 | A |   | 1/1959 | Vogler |                    |
|-----------|---|---|--------|--------|--------------------|
| 2,970,862 | A | * | 2/1961 | Racine | B60N 2/4221        |
|           |   |   |        |        | 180/271            |
| 3,877,749 | A |   | 4/1975 | Sakurai et al. |            |
| 3,888,329 | A | * | 6/1975 | Monaghan | B60R 21/02       |
|           |   |   |        |        | 280/734            |
| 3,951,429 | A |   | 4/1976 | Satzinger |                 |
| 4,109,959 | A |   | 8/1978 | Barecki et al. |            |
| 4,335,918 | A | * | 6/1982 | Cunningham | B60N 2/42745   |
|           |   |   |        |        | 280/751            |
| 5,294,175 | A | * | 3/1994 | Elton  | B60N 2/4221        |
|           |   |   |        |        | 297/216.1          |
| 5,882,072 | A | * | 3/1999 | Morlock | B64D 25/04        |
|           |   |   |        |        | 297/216.1          |
| 5,902,010 | A | * | 5/1999 | Cuevas | B60N 2/4415        |
|           |   |   |        |        | 280/730.1          |
| 6,237,991 | B1| * | 5/2001 | Weber  | B60N 2/4235        |
|           |   |   |        |        | 296/146.6          |
| 6,290,292 | B1| * | 9/2001 | Tsukada | B60N 2/433        |
|           |   |   |        |        | 297/216.14         |

(Continued)

FOREIGN PATENT DOCUMENTS

JP        2004224241        8/2004

*Primary Examiner* — Charles A Fox
*Assistant Examiner* — Christopher E Veraa
(74) *Attorney, Agent, or Firm* — Frank A. MacKenzie; Bejin Bieneman PLC (57) ABSTRACT A seatback includes a frame and a panel rotatably coupled to the frame. A support bracket is attached to the frame with a lever is rotatably coupled to the support bracket. The lever is configured to engage the panel with a frame supported actuator via a cable attached to the actuator and the lever.

20 Claims, 7 Drawing Sheets (56) References Cited

U.S. PATENT DOCUMENTS

| | | | |
|---|---|---|---|
| 6,588,838 B1* | 7/2003 | Dick, Jr. | B60N 2/449 280/730.1 |
| 6,752,423 B2* | 6/2004 | Borde | B60R 21/02 280/753 |
| 6,953,223 B2 | 10/2005 | Nelson et al. | |
| 7,401,852 B2* | 7/2008 | Humer | B60N 2/4228 297/216.1 |
| 8,398,113 B2* | 3/2013 | Choi | B60R 21/207 280/730.1 |
| 2004/0080196 A1* | 4/2004 | Kopetzky | B60N 2/66 297/284.4 |
| 2005/0200171 A1* | 9/2005 | Saiguchi | B60N 2/4221 297/216.12 |
| 2005/0218641 A1* | 10/2005 | Tajima | B60R 21/045 280/752 |
| 2006/0255632 A1* | 11/2006 | Sugimoto | B60N 2/58 297/216.12 |
| 2008/0145635 A1* | 6/2008 | Stoll | B60N 2/58 428/223 |
| 2010/0140999 A1* | 6/2010 | Kladde | B60N 2/181 297/284.4 |
| 2013/0119723 A1* | 5/2013 | Nitsuma | B60N 2/4228 297/216.13 |

\* cited by examiner

ENERGY ABSORBING SEATBACK PANEL

BACKGROUND

An interior of a vehicle, such as automobile, typically includes energy absorbers for absorbing kinetic energy from occupants of the vehicle during an impact of the vehicle. One or more of the energy absorbers may be passive and designed and built into the interior of the vehicle. One or more of the energy absorbers can be active and triggered when an impact is detected. The active energy absorber may be in communication with an actuator and an impact sensing system. The impact sensing system may include a plurality of sensors for sensing the impact and a controller in communication with the sensors and the actuator. The controller, based upon an impact sensed by the sensors, causes the actuator to be triggered to deploy the active energy absorber.

The vehicle may include energy absorbers to absorb energy from rear occupants, i.e., occupants seated behind a first row of seats, during impact. During a frontal impact, the rear occupants may move forward toward the front row of seats. However, the space in the interior of the vehicle is limited. As such, there remains an opportunity to design an energy absorber for rear occupants that fits within packaging constraints of the vehicle and may be cost effective to install and replace.

DETAILED DESCRIPTION

Figure 1:
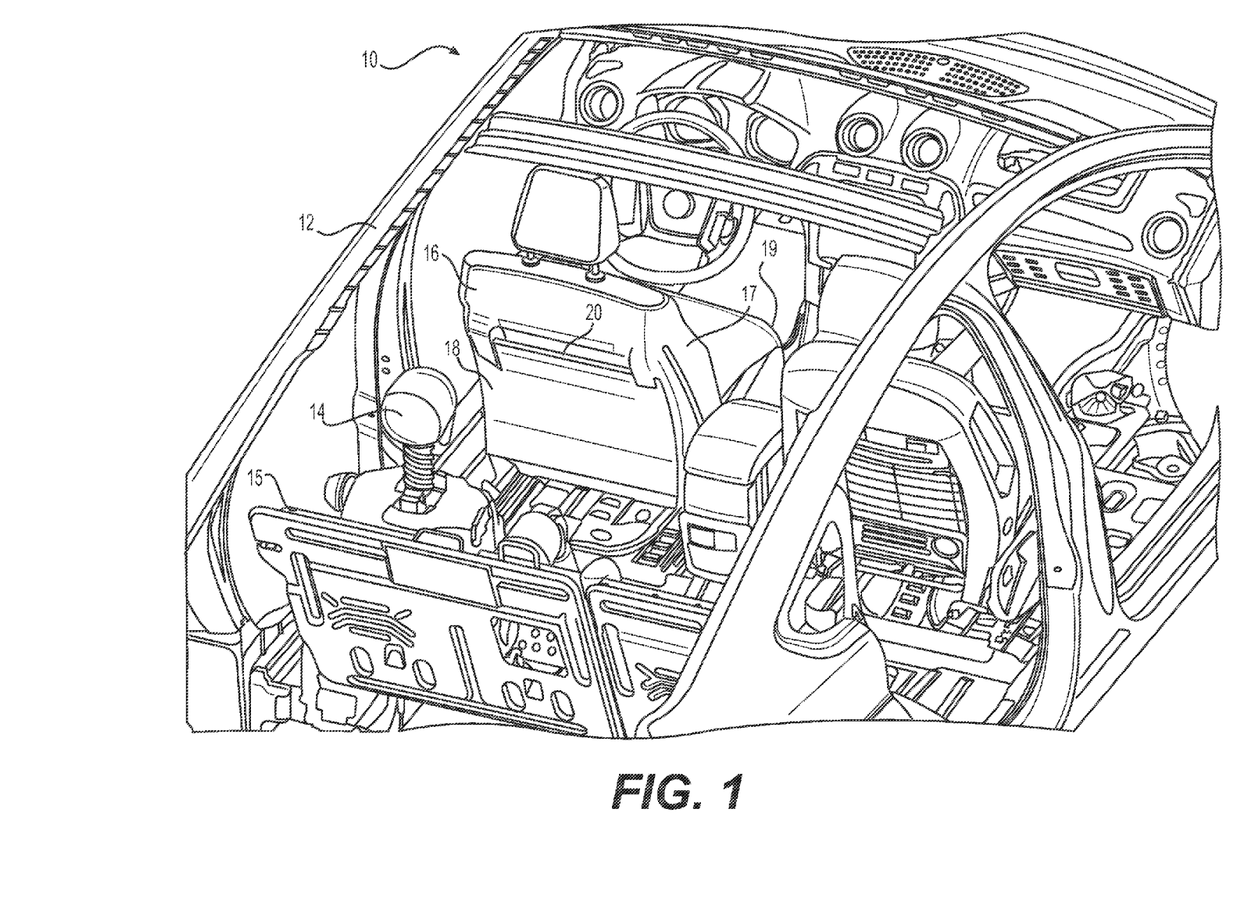
FIG. 1 is a perspective view of a vehicle seat with a panel in a stowed position.
Figure 2:
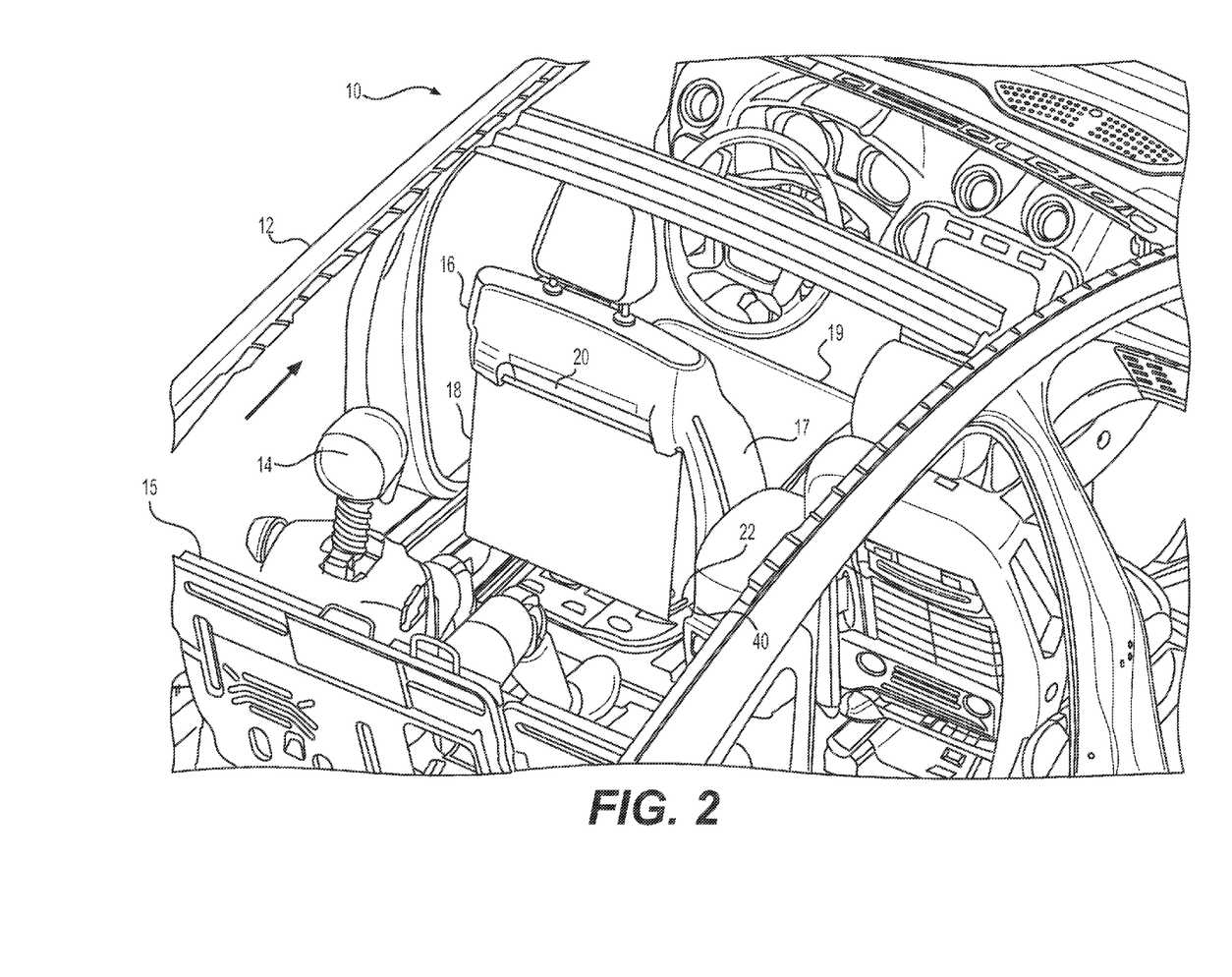
FIG. 2 is a perspective view of the vehicle seat with the panel in a deployed position.

With reference to the Figures, wherein like numerals indicate like parts throughout the several views, a vehicle 10 is generally shown. With reference to FIGS. 1-2, an occupant 14 (e.g., a test dummy 14 in FIGS. 1-2) is seated in a rear seat 15 behind a front seat 17. With continued reference to FIGS. 1-2, the front seat 17 includes a seat bottom 19 and a seatback 16 extending upwardly from the seat bottom 19. The seatback 16 includes a panel 18 rotatably coupled to a frame 26 via a hinge joint 20, as shown in FIG. 3.

In the event of a rapid deceleration of the vehicle 10, such as in a collision with another vehicle, the occupant 14 of the rear seat 15 will tend to keep moving in the direction of the vehicle 10 during the deceleration of the vehicle 10. Upon such an occurrence, the panel 18, which is attached to the frame 26 via the hinge joint 20 will rotate away from the seatback 16 and create a kinetic energy absorbing buffer space between the occupant 14 and the front seat 17. In other words, as the occupant 14 moves toward the seatback 16, the occupant 14 may contact the panel 18 may absorb energy from the occupant 14.

Figure 3:
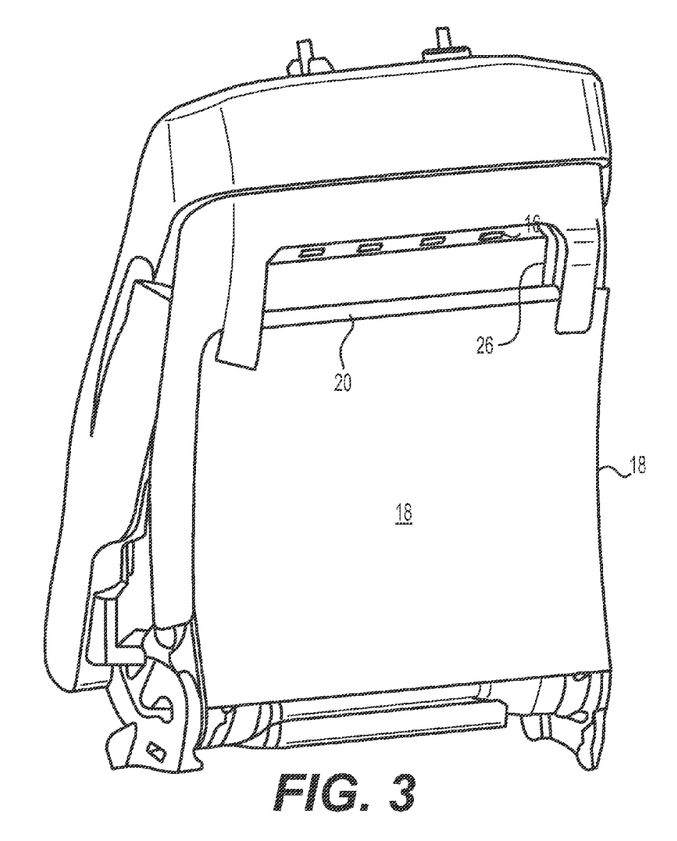
FIG. 3 is a rear view of the panel in the stowed position.
Figure 5:
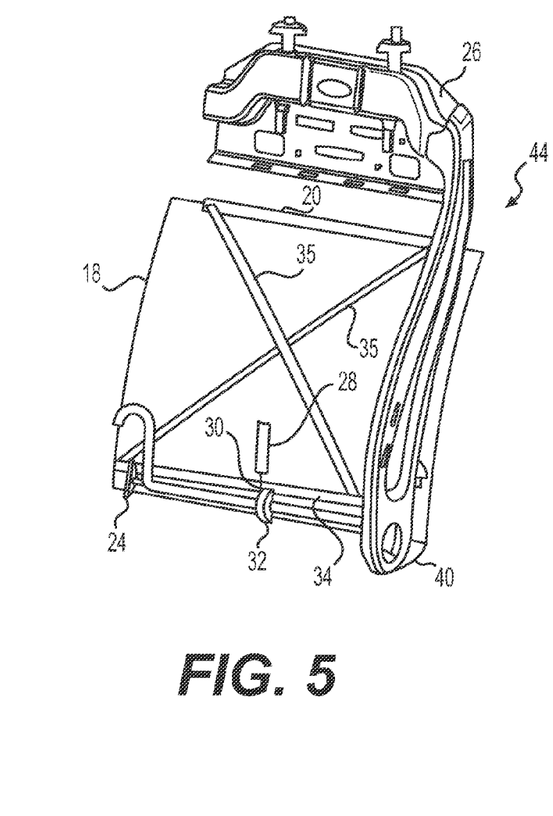
FIG. 5 is a perspective view of a portion of the panel in the stowed position showing a lever, a support bracket, a frame, an actuator, a cable, a member, and a reinforcing member.
Figure 6:
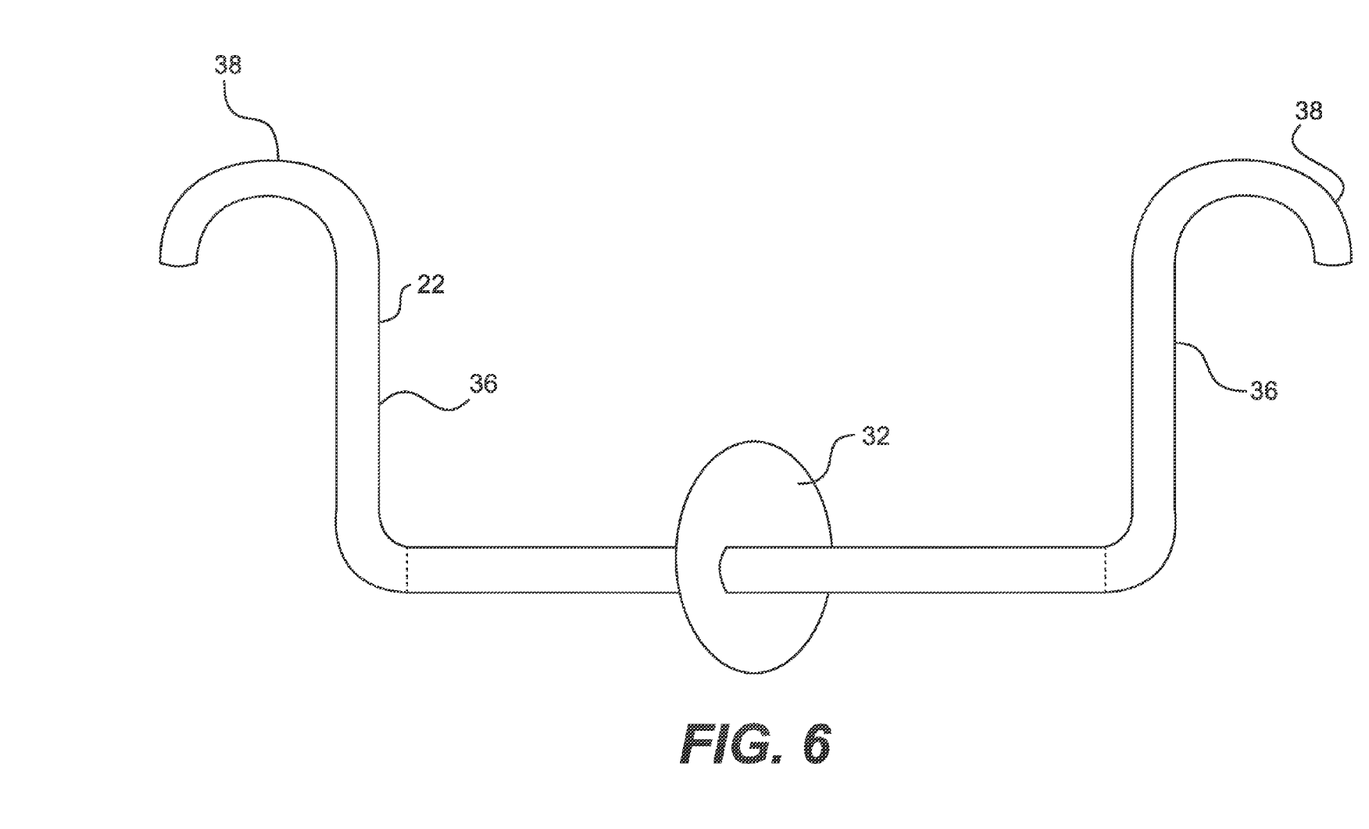
FIG. 6 is a perspective view of a lever showing a rod with an arm with a rounded end.
Figure 7:
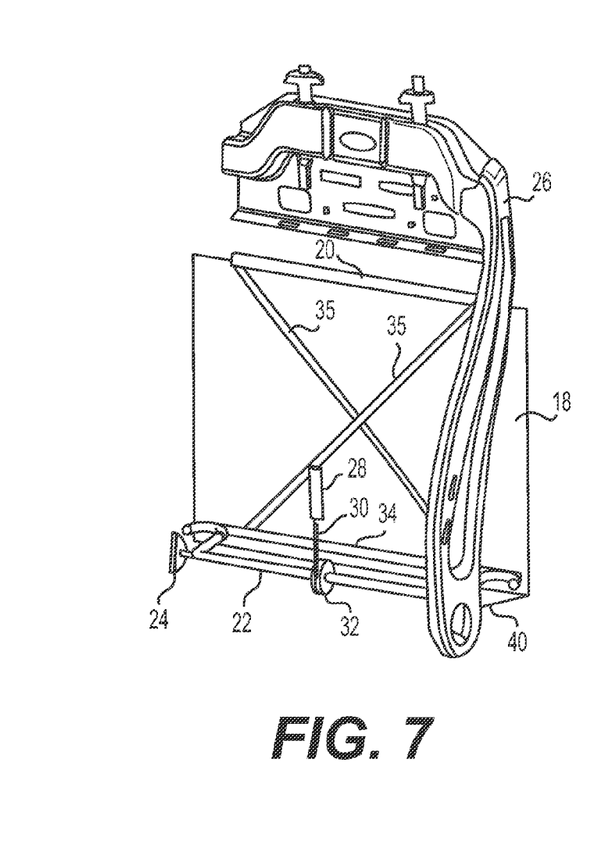
FIG. 7 is a perspective view of the panel in the deployed position.
Figure 8:
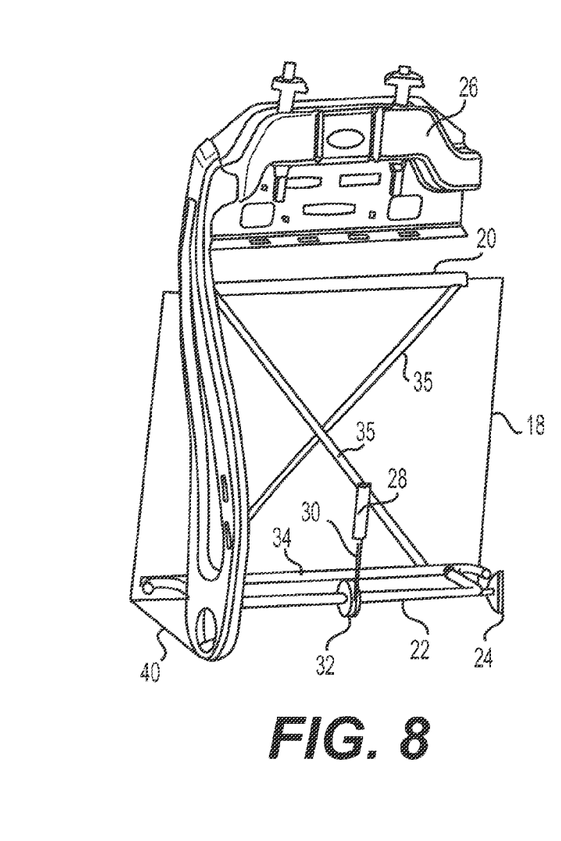
FIG. 8 is a perspective view of the panel in the deployed position.

The panel 18, more specifically, may move between a stowed position, as shown in FIGS. 1,3 and 5, and a deployed position, as shown in FIGS. 2, 7 and 8. In the stowed position, the panel 18 is retracted relative to the frame 26 to minimize occupied space in the passenger compartment of the vehicle 10. In the deployed position, at least a portion of the panel 18 is spaced from the frame 26 to absorb energy from the occupant 14, e.g., the legs and/or feet of the occupant 14.

Figure 4:
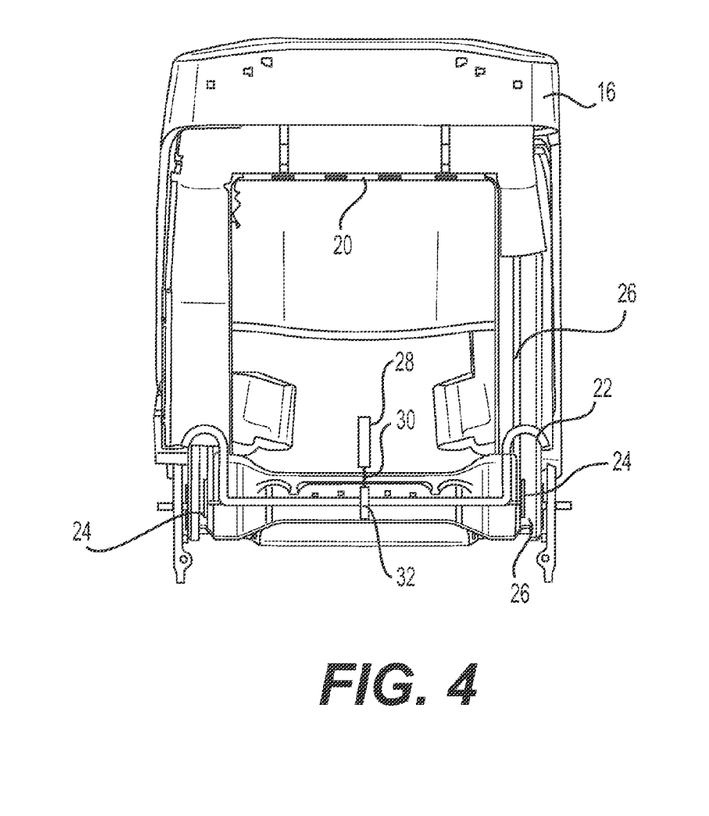
FIG. 4 is a rear view of a portion a frame of the vehicle seatback without the panel shown for illustrative purposes.

A support bracket 24 is fixed on either side of the frame 26 and a lever 22 is rotatably coupled to the support bracket 24, as shown in FIG. 4. The hinge joint 20 is spaced from the lever 22 as shown in FIG. 5. The lever 22 is configured to engage the panel 18, as shown in FIG. 7. In other words, the lever 22 contacts the panel 18 and moves at least a portion of the panel 18 away from the frame 26 in the deployed position, as set forth further below.

An actuator 28 is coupled to the frame 26. The actuator 28 is configured to move the panel 18 from the stowed position to the deployed position. A cable 30 is fixed to and extends from the actuator 28 and is coupled to the lever 22 deployment member 32 may be fixed to the lever 22 and may present an attachment point spaced from the lever 22 and fixed to the cable 30. The deployment member 32 may be a disc annularly disposed about the lever 22 (as shown) or the deployment member 32 may be a fulcrum rod (not shown) attached to the lever 22 to increase the mechanical advantage of the lever 22. Alternatively, the deployment member 32 may be any suitable configuration.

When an impact is sensed, the actuator 28 retracts the cable 30 to rotate the deployment member 32 and the lever 22 relative to the support bracket 24. As the lever 22 pivots the panel 18 about the hinge joint 20 to move the panel 18 to the deployed position. The actuator 28 may, for example, be in communication with an impact sensing system 62, which detects input from of the vehicle 10, as set forth further below. The actuator may, for example, be a pyrotechnic actuator or, alternatively, may be any suitable type.

The lever 22 may be deformable relative to the frame 26. As such, when the lever 22 is rotated to move the panel 18 to the deployed position, the lever 22 may deform when contacts the panel 18. The deformation of the lever 22 absorbs energy from the occupant 14. For example, sections of the lever 22, such as an arm 36 and/or a rounded end 38 may be configure to collapse or pivot selectively outward, rearward and upward, in a predetermined manner under stress loads during a collision. The lever 22 may, for example, be a rigid polymer, e.g., a plastic, a composite material, or a soft metal such as aluminum, etc. The rounded end 38 is rounded to encourage collapse and to slide across the panel 18 as the two panel 18 is moved to the deployed position.

When the actuator 28 is activated to rotate the lever 22 and move the panel 18 to the deployed position, as shown in FIG. 7, the lever 22 causes the panel 18 to be taught between the hinge joint 20 and the lever 22. Since panel 18 is taught when deployed, the panel 18 acts as a kinetic energy absorbing buffer between the occupant 14 and the frame 26.

A spring mechanism 40 may be fixed to the frame 26 and the panel 18, e.g., a lower portion of the panel 18. When the panel 18 is in the undeployed position, the spring mechanism 40 is slack, as shown in FIG. 5. When the panel 18 is deployed to the deployed position, the spring mechanism 40 becomes taut to position the panel 18 relative to the frame 26 and align the panel 18 on to the lever 22, as shown in FIG. 7.

The panel 18 may be flexible relative to the frame 26 and/or the lever 22. The panel 18 may be, for example, nylon, polyester, or any polymer with an appropriate tensile strength and elasticity. Alternatively, the panel 18 may be any suitable material. In order to help increase the strength of the panel 18, a strip 34 material may be affixed to the panel positioned to receive the lever 22 when the panel 18 is deployed, as shown in FIG. 7. In addition to, or in the alternative to the strip 34, an additional strip 35 may be also affixed on to the panel 18. For example, the additional strip 35 may extend from the corners of the panel 18 in a diagonal direction across the panel 18, as shown in FIG. 5. The strip 34 and the additional strip 35 may be same material as the panel 18 or may be a different material than the panel 18.

The strip 34 and the additional strip 35 may be integral with the panel 18, i.e., formed together simultaneously as a single unit. For example, the strip 34, the additional strip 35 and the panel 18 may be integrally formed by injection molding. The strip 34 and the additional strip 35 alternatively, may be formed separately from the panel 18 and subsequently added to the panel 18. For example, the strip 34 and the additional strip 35 may be attached by an adhesive compound or chemically welded to the panel 18. As another example, the strip 34 and the additional strip 35 may be sewn on to the panel 18 with thread.

The panel 18, may present a class-A surface, i.e., a surface specifically manufactured to have a high quality, finished aesthetic appearance free of blemishes. The panel 18 in the stowed position may be substantially flush with the rest of the seatback 16, e.g., aligned along the edges of an opening without indentation.

Figure 9:
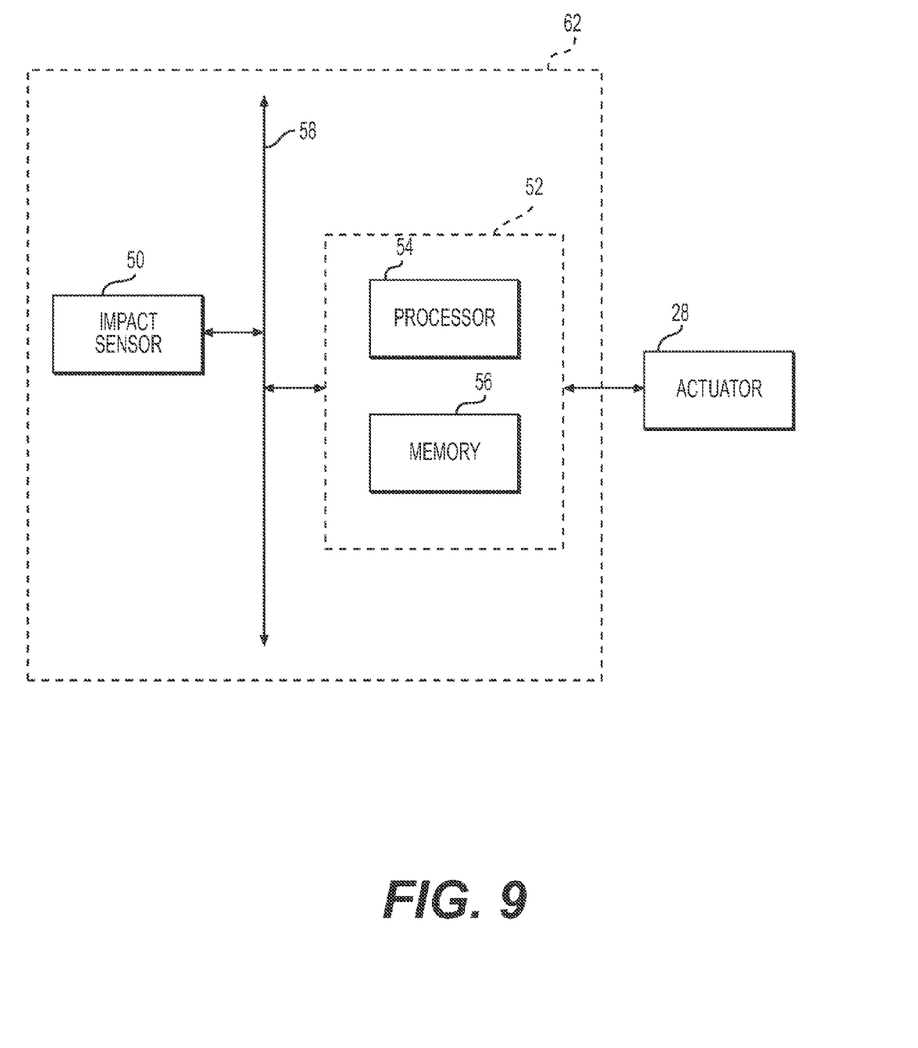
FIG. 9 is a block diagram of an actuator and an impact sensing system.

With reference to FIG. 9, the vehicle 10 may include an impact sensing system 62. The impact sensing system 62 may include an impact sensor 50 and a controller 52. The controller 52 is in communication with the actuator 28 and may include a processor 54 and a memory 56, as shown in FIG. 9. The memory 56 stores instructions executable by the processor 54 to control the actuator 28. The controller 52 may be programmed to, upon identification of impact information provided by the impact sensor 50, cause triggering of the actuator 28.

The impact sensor 50 may be of an accelerometers device, for example, a piezoelectric type, a piezoresistive type, a capacitive type or a micro electro-mechanical systems (MEMS) type or any type which detects a sudden deceleration. The impact sensor may also be a radar device which uses radio waves to determine a proximity and a speed of an object relative to the impact sensor 50. Additionally, the impact sensor may be a lidar device which utilizes light waves to achieve the same functionality as the radar system. Furthermore, the impact sensor 50 may be a vision system which may include one or more cameras, CCD image sensors, and/or CMOS image sensors to detect a nearing object.

Communications between the controller 52, the impact sensor 50, the actuator 28, and or other components in or around the vehicle 10, may be connected to a communication bus 58, such as a controller area network (CAN) bus, of the vehicle 10. The controller 52 may use information from the communication bus 58 to control the triggering of the actuator 28. In the event of a collision, the impact sensing system 62 detects an impact from the impact sensor 50. The impact sensing system 62 will then instruct the actuator 28 to activate. When activated, the actuator 28 will pull the cable 30 towards the actuator 28. This upward movement of the cable 30 rotates the lever 22 to rotates and push the panel 18 away from frame 26 to the space the panel 18 from the frame 26 to absorb energy from the occupant 14 in the event the occupant 14 moves toward the seatback 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatback, comprising:
   a frame;
   a panel rotatably coupled to the frame at a hinge joint;
   a support bracket supported by the frame;
   a lever spaced from and decoupled from the hinge joint and rotatably coupled to the support bracket and configured to engage the panel at a location along the panel spaced from the hinge joint; and
   a pyrotechnic actuator supported by the frame and having a cable attached to the lever.

2. The seatback of claim 1, further comprising a deployment member fixed to the lever and presenting an attachment point spaced from the lever and connected to the cable.

3. The seatback of claim 2, wherein the deployment member is a disc annularly disposed about the lever.

4. The seatback of claim 1, wherein the lever is deformable relative to the frame.

5. The seatback of claim 1, wherein the lever is plastic.

6. The seatback of claim 1, wherein the lever is a composite material.

7. The seatback of claim 1, wherein the lever is aluminum.

8. The seatback of claim 1, wherein the lever includes a rod coupled to the support bracket and an arm extending transversely from the rod.

9. The seatback of claim 8, wherein the arm is deformable relative to the frame.

10. The seatback of claim 8, wherein the arm includes a rounded end.

11. The seatback of claim 10, wherein the rounded end is deformable relative to the frame.

12. The seatback of claim 8, wherein the arm is plastic.

13. The seatback of claim 1, further comprising a spring mechanism coupled to the frame and to the panel and extending from the frame to the panel, the spring mechanism being spaced from the hinge joint.

14. The seatback of claim 1, wherein the panel is nylon.

15. The seatback of claim 1, wherein the panel is polyester.

16. The seatback of claim 1, wherein the seatback further comprising a strip positioned to receive the lever.

17. The seatback of claim 16, further comprising an additional strip extending across the panel.

18. The seatback of claim 1, wherein the panel presents a class A surface.

19. The seatback of claim 1, wherein the panel is flexible relative to the frame and the lever.

20. The seatback of claim 8, further comprising a deployment member fixed to the lever and presenting an attachment point spaced from the lever and connected to the cable, wherein the arm is longitudinally spaced from the attachment point along the lever.

* * * * *